R. O. HOOD.
ELECTRICAL WELDING MECHANISM.
APPLICATION FILED JUNE 1, 1917.

1,288,589.

Patented Dec. 24, 1918.

Inventor
Ralph O. Hood
by [signature]
Attorneys

UNITED STATES PATENT OFFICE.

RALPH O. HOOD, OF DANVERS, MASSACHUSETTS, ASSIGNOR TO CLINTON WIRE CLOTH COMPANY, OF BOSTON, MASSACHUSETTS, A CORPORATION OF MASSACHUSETTS.

ELECTRICAL WELDING MECHANISM.

1,288,589.  Specification of Letters Patent.  Patented Dec. 24, 1918.

Application filed June 1, 1917. Serial No. 172,197.

*To all whom it may concern:*

Be it known that I, RALPH O. HOOD, a citizen of the United States, residing at Danvers, in the county of Essex and State of Massachusetts, have invented new and useful Improvements in Electrical Welding Mechanism, of which the following is a specification.

This invention relates to means for automatically regulating the electric current used in electric welding.

The present invention consists of means for controlling the welding circuit by measuring the energy utilized in the welding operation and disconnecting the current after a predetermined quantity of energy has been utilized. Or, stating it in another way, according to the present invention, a certain definite or predetermined amount of electrical energy is supplied for the welding operation and the circuit disconnected thereafter.

In the illustrated embodiment of the invention, to which it will be understood the scope of the invention is not limited, each pair of electrodes (of which there may be a number, arranged in multiple as ordinarily) is arranged in series with an element by which a cut-out is actuated to break the circuit upon the movement of a movable member through a predetermined space. The movable member in said embodiment takes the form of either a solenoid plunger, or a metallic bar which expands when heated, but any equivalent therefor for the cut-out and movable member may be employed. In either case the circuit is opened by the cut-out or the cessation of the supply of welding current is caused as soon as a definite amount or quantity of electrical energy has passed through the parts to be welded. The radiation and the conduction of the heat from the locus of the weld in the short period of the welding operation may be compensated for in any suitable manner, as by having the voltage rise at a constant rate during the total time allowed for the welding operation—the rate of the voltage increase being sufficient to offset the effect of the heat radiation and conduction, so that any variation in contact resistance of the parts at the welding point varies the time occupied in the welding operation from the average, with the result that the contacting parts at the welds will be heated to the same temperatures and the welds will all be similar.

Since the means for increasing the voltage rate are well known, and, *per se*, are not of my invention, I have not illustrated them.

On the accompanying drawings,—

It will be understood, as previously indicated, that the invention is not limited to the specific means illustrated and hereinafter described; that the spirit of the invention is broader than the particular construction shown and that I may depart therefrom to a large degree without departing from the scope of the claims appended hereto.

Figure 1:
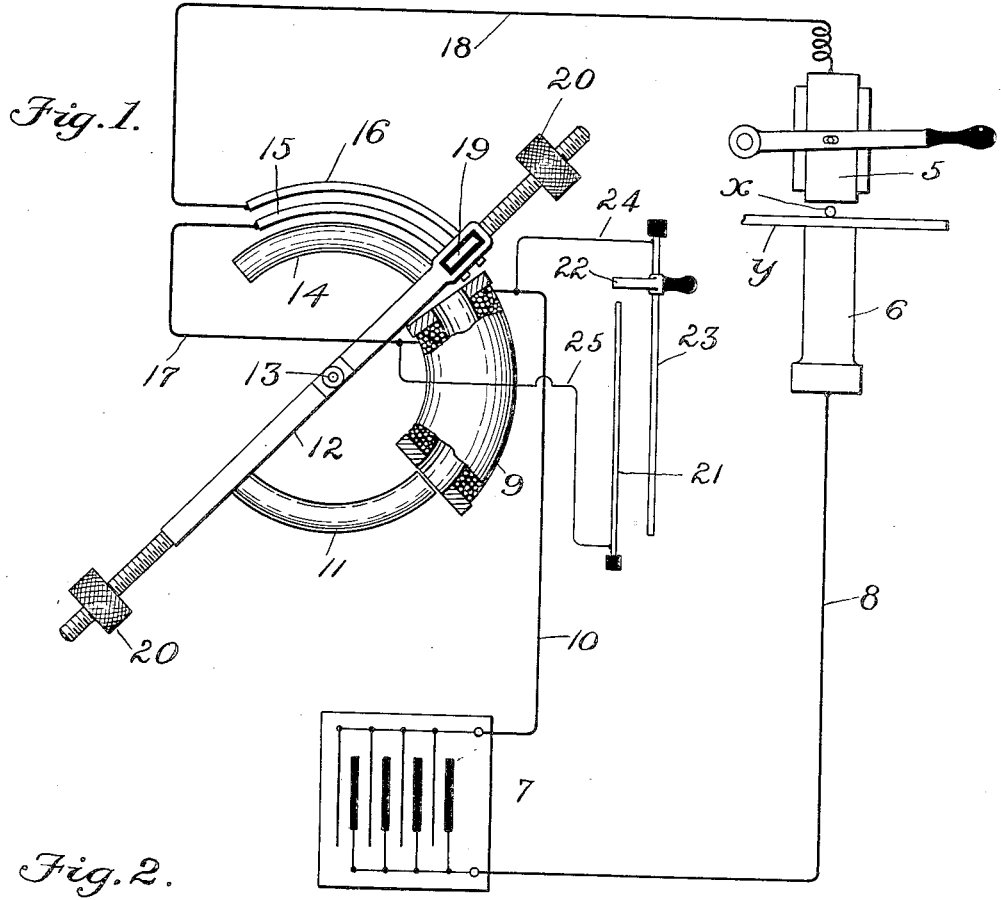
Figure 1 represents diagrammatically an embodiment of the invention in which the movable member carrying the cut-out consists of a solenoid plunger, the associated solenoid being arranged in series with the electrodes.

On the drawings, referring first to Fig. 1, 5 and 6 indicate the electrodes of any well-known type of electric welding machine. There may be as many pairs of such electrodes, arranged in multiple, as may be desired. 7 indicates a source of electrical energy, which is here shown as a storage battery, but it may be replaced by the usual transformer and an electrical generator connected to the primary or high-tension side thereof. The electrode 6 is connected with the source of energy by a line conductor 8. 9 indicates a solenoid connected with the source of electrical energy 7 by a conductor 10. The solenoid is arcuate in form, and its plunger 11 is similarly curved. Said plunger is secured to a centrally pivoted lever 12 movable freely about a vertical pivot 13 and provided with a curved weight 14 counterbalancing the plunger. 15, 16 are two curved elongated contact strips concentric with the pivot, the former being connected with the solenoid by a conductor 17, and the latter with the electrode 5 by a conductor 18. The arm 12 carries a brush 19 of electrically-conducting material adapted to move along the contacts 15, 16 until it passes beyond the ends thereof, said brush being preferably insulated from the lever. The stationary contact members are of predetermined length, so that the brush must move through a predetermined space or arc, before it breaks the circuit, which includes the electrodes, the solenoid, the contact strips, the source of energy, and the conductors 8, 10, 17 and 18. Normally the lever 12 is in the position shown and the electrodes are separated. When the movable electrode 5 is moved to engage and close the circuit through the elements *x* and *y* to be welded, the current flows through the remainder of the circuit whereupon the coils of the solenoid are energized to pull the plunger, and the lever is swung above its pivot, causing the brush to move along the contact strips until it passes beyond the ends thereof and breaks the circuit. After the weld has been completed and the electrodes have been separated, the lever and plunger may be returned to their initial positions by hand or automatically, as desired. The time required for the passage of the brush through the space occupied by the contact strips will vary inversely with the strength of the current in the solenoid, and according to physical laws, this space will represent the electrical energy which is passed, irrespective of the resistance of the electrodes and the elements being welded, which might affect the length of time occupied in the movement of the plunger or the brush. This may be represented by the algebraic formula—

$$\sqrt{2s} = a \times t$$

in which $s$=the space; $a$=the amperes; and $t$, the time. A constant space (*i. e.*, the length of the contact strips) makes the product of amperes and time constant, and hence, the amount of the energy consumed in the weld is measured and kept constant for the welds, since a decrease in the energy, due to imperfect contact of the elements being welded, is accompanied by an increase in the time occupied by the movement of the plunger and the brush, all on the assumption that the voltage is constant. If desired, as previously stated, the voltage may be caused, by any suitable means to rise to compensate for losses in radiation and conduction of heat from the locus of the weld.

As an incidental matter of construction the lever 12 may be provided at its ends with adjustable weights 20, 20, the adjustment of which will vary the inertia of the moving parts. The brush and the contact strips constitute a cutout which controls the welding circuit, but which, if a transformer be used, may control the line circuit on the primary or high-tension side of the transformer. The cut-out is operated or controlled by a movable element, in this case the plunger (and its connected lever) which is under the control of an element or member, *i. e.*, the solenoid, in electrical series with the electrodes. The energy delivered to the solenoid may be regulated by any suitable form of variable resistance. I have shown for this purpose a resistance bar 21, a contact 22 therefor movable along a guide, a conductor 23, and conductor wires 24, 25 connected with the conductors 10 and 17 in shunt around the solenoid.

Figure 2:
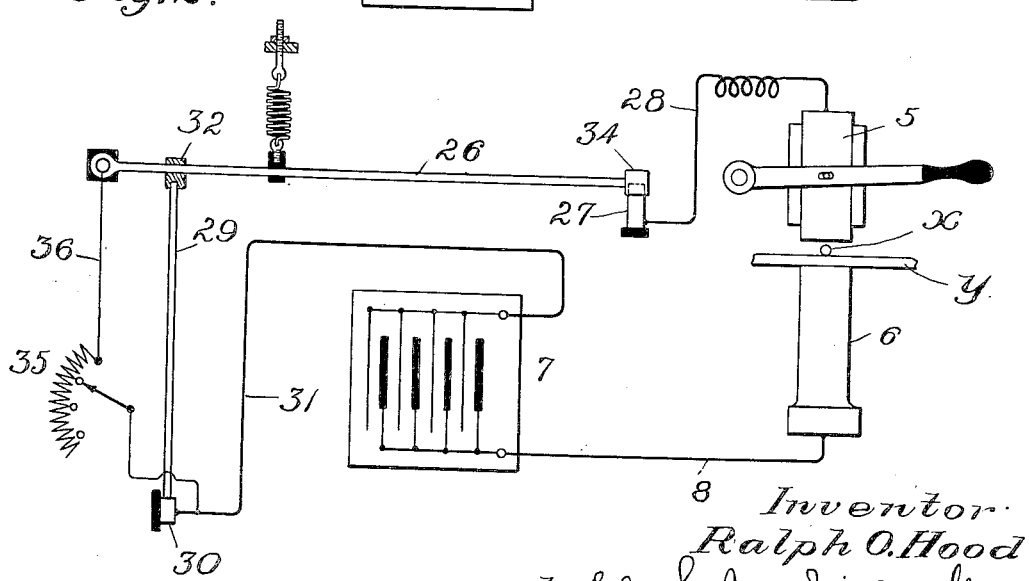
Fig. 2 represents another embodiment of the invention in which the cut-out is controlled or moved by an expansible member heated electrically and arranged in series with the electrodes.

In Fig. 2 I have shown another form of my invention in which the cut-out consists of the spring-tensioned arm 26 having a movable contact 34 adapted slidingly to engage the stationary contact 27, the latter being connected in series with the electrode 5 by a conductor wire 28. 29 indicates what may be termed the movable element which is electrically energized, and it consists of a thermostatic rod or wire of resistance metal which expands when heated. One end of said element or member is fixed, as at 30, and is connected by a conductor wire 31 with the source of electrical energy 7. The free end of the member is provided with a head 32 which moves as the member 29 expands or contracts and which operates the cut-out arm 26, so that when the contact member 34 has moved through a predetermined space along the contact 27, it will separate therefrom to break the circuit.

35 represents a resistance included in a shunt circuit 36 around the thermostatic wire or rod, for the same general purpose as the resistance previously described in connection with Fig. 1.

From the foregoing description it will be seen that the time occupied in the welding operation will vary, but in each case, there will always be measured a predetermined amount of electrical energy supplied to the weld before the current is cut off. In this way I am able to obtain welds that are of a constant grade, irrespective of variations in the contact of the parts to be welded, or of the presence of small particles of dirt or other foreign matter. While not limited in its use thereto, the invention is particularly applicable for welding together parts of small cross diameter.

Having thus explained the invention and described the forms of its embodiment, without attempting to describe all the forms in which it may be made, or all the modes of its use, what I claim is:

1. An electrical welding mechanism comprising electrodes and means automatically operative from the welding circuit for stopping the welding action when a measured amount of energy has been used therein.

2. An electrical welding mechanism comprising electrodes and electrically controlled means for measuring a predetermined amount of electrical energy for the welding action.

3. An electrical welding mechanism comprising electrodes and electrical means in series with the electrodes for automatically measuring the amount of electrical energy supplied in the welding action, and stopping the welding action when a predetermined amount of said energy has been utilized.

4. An electrical welding mechanism comprising electrodes, a cut-out for stopping the supply of current to the electrodes, and electrical means electrically connected with the welding circuit for operating said cut-out when a predetermined amount of electrical energy has been supplied for the welding operation.

5. An electrical welding mechanism comprising electrodes, a cut-out for stopping the supply of current to the electrodes, a movable member for actuating said cut-out, and means in the electrical circuit and electrically energized to move said member at variable speed through a predetermined space in accordance with the electrical energy utilized in the welding action.

6. An electrical welding mechanism comprising electrodes, a cut-out for stopping the supply of current to the electrodes, and comprising a contact strip of predetermined length and a movable brush, movable along said strip to an electrically inactive position, and electromagnetic means, in series with said electrodes for moving said brush along said strip at speeds varying with the amount of electrical energy utilized in the welding action.

7. An electrical welding mechanism comprising electrodes, a cut-out for stopping the supply of current to the electrodes, and comprising a contact strip of predetermined length and a movable brush, movable along said strip to an electrically inactive position, a solenoid in series with the electrodes, and a plunger therefor operatively connected with said brush.

8. An electrical welding mechanism comprising electrodes, a cut-out for stopping the supply of current to the electrodes, and electrical means electrically connected with the welding circuit for operating said cut-out when a predetermined amount of electrical energy has been supplied for the welding operation, and a variable resistance arranged in multiple with said electrical means.

9. An electrical welding mechanism comprising electrodes and electrically controlled means for determining the amount of electrical energy supplied for the welding action combined with a variable resistance for controlling the operation of said electrically-controlled means.

10. An electrical welding mechanism comprising electrodes, a cut-out for stopping the supply of current to the electrodes, and comprising a contact strip of predetermined length and a movable brush, movable along said strip to an electrically inactive position, a solenoid in series with said electrodes, a pivoted arm carrying said brush, and a plunger connected to said arm and associated with said brush.

11. A process of welding which comprises supplying an electric welding current, measuring the amount of electrical energy supplied for the welding action, and automatically causing a cessation of the current when a predetermined amount of electrical energy has been supplied.

In testimony whereof I have affixed my signature.

RALPH O. HOOD.